Apr. 3, 1923.

C. A. FISK 1,450,843

NONPNEUMATIC TIRE

Filed June 15, 1922

WITNESSES
E. A. Wilson
Harrison Ost.

INVENTOR
Carl A. Fisk
BY
ATTORNEYS

Patented Apr. 3, 1923.

1,450,843

UNITED STATES PATENT OFFICE.

CARL A. FISK, OF NEW YORK, N. Y.

NONPNEUMATIC TIRE.

Application filed June 15, 1922. Serial No. 568,466.

*To all whom it may concern:*

Be it known that I, CARL A. FISK, a citizen of the United States, and a resident of the city of New York, borough of Bronx, in the county of Bronx and State of New York, have invented a new and Improved Nonpneumatic Tire, of which the following is a full, clear, and exact description.

This invention relates to resilient tires for vehicle wheels and aims as its principal object to produce a substitute for pneumatic tires.

As a further object the invention contemplates a filler element for disposal within the outer shoe or casing of a tire which replaces the usual inflated inner tube; functions to give the required resiliency and at the same time eliminates the trouble and objections incident to inflated or pneumatic tires by precluding punctures and blow-outs.

As a further object the invention contemplates a device of the character described which is comparatively simple in its construction, strong and durable, and which is thoroughly reliable and highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1:
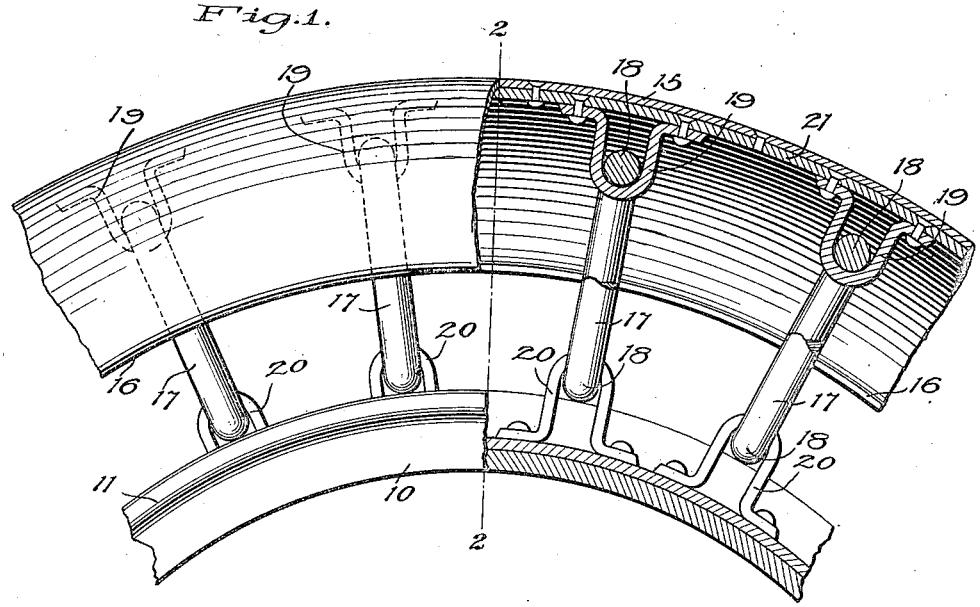
Figure 1 is a fragmentary side elevation of a vehicle rim equipped with the shoe filler constructed in accordance with the invention, parts being broken away and shown in section to disclose the underlying structure.
Figure 2:
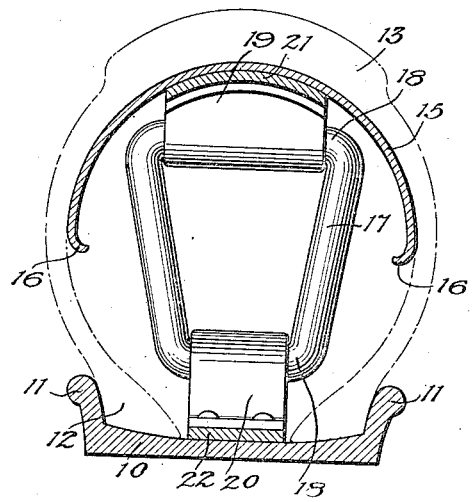
Fig. 2 is a transverse sectional view therethrough taken approximately on the line indicated at 2—2 in Fig. 1.

Referring to the drawing by characters of reference, 10 designates a tire rim of any approved construction which is provided at its opposite sides with the flanges or beads 11 for engagement with the beads 12 of the tire shoe or casing 13. The rim may be of detachable or attached type without in any way effecting the invention. The tire filler which constitutes the invention and serves as a substitute for the usual inflated inner tube consists of an annular flexible metallic member 15 which is of substantially semi-cylindrical configuration in cross section, the inner edges thereof being turned inwardly as at 16. The member 15 is normally attached in concentric relation to the rim 10 by a plurality of radially disposed links 17, the opposite extremities or bights 18 of which are mounted transversely within the inwardly projecting U-shaped bearing members 19 carried by the member 15 and the outwardly projecting U-shaped bearing members 20 carried by the rim 10. Preferably the bearing members 19 and 20 in lieu of direct attachment to the member 15 and the rim 10 are secured to outer and inner rings 21 and 22 which are in turn respectively attached to the outer member 15 and the rim 10. The bearing members constituting means for permitting the swinging of the links and sliding of the same.

In use and operation the axle is suspended by the uppermost links from the upper portion of the resilient member 15, thus effecting an eccentric downward movement of the rim 10 with respect to the member 15 in absorbing and cushioning the shocks and road jars. When this action occurs the lowermost bearing elements 19 and 20 will compensate for a sliding movement between the lowermost links 17, while the side bearing members 19 and 20 will permit of relative swinging of the links due to the eccentric relation of the member 15 with respect to the rim 10. The normal resiliency of the outer member 15 tends to exert a radial expansion of the shoe or casing 13, and this inherent resiliency serves to prevent relative circumferential movement between the shoe and the member 15 and between the shoe and member 15 and the rim 10 when the structure is employed on the driving wheel. The filler takes the place of a pneumatic tire, eliminates the troubles and objections thereto due to punctures, blowouts or the like and in a large measure serves to overcome various tire troubles as well as increasing the length of service of the shoe or casing. The shoe or casing may be removed and applied in the usual manner and renewed when unfit for further use.

I claim:

1. A non-pneumatic resilient filler for a tire shoe or casing comprising a resilient band of semi-circular configuration in cross section arranged within the shoe or casing adjacent the tread portion thereof, and a connection between said band and the tire shoe supporting rim for normally maintaining the band in spaced concentric relation to the rim, said connection consisting of inwardly disposed looped bearing members on the band, outwardly disposed looped bearing members on the rim, and a radially disposed link between each bearing member of the band and rim having the opposite bight portions thereof respectively engaging the inner and outer bearing members, for swinging and sliding movements with respect to the bearing members.

2. The combination with the outer shoe or casing of a tire and a channeled supporting rim between which the beads thereof are received, of a filler for resiliently maintaining the tread portion of the casing normally in concentrically spaced relation to the rim, said filler including an outer resilient band of a transverse configuration corresponding to the inner tread portion of the shoe or casing and arranged within said portion of the shoe or casing, an inner band attached to the rim and lying between the inner beads of the shoe or casing, and a connection between said bands for slidingly and swingingly associating the same, said connection comprising inwardly projecting transversely disposed circumferentially spaced looped bearing members on the outer band, outwardly projecting transversely disposed circumferentially spaced looped bearing members on the inner band and radially disposed links extending between the corresponding bearing members of the inner and outer bands, said links having the opposite bight portions thereof respectively received by the inner and outer bearing members for swinging and sliding movements with respect thereto.

CARL A. FISK.